United States Patent [19]

Haenen et al.

[11] 4,249,208
[45] Feb. 3, 1981

[54] GAMMA CORRECTION CIRCUIT FOR A VIDEO SIGNAL AND TELEVISION CAMERA SUITABLE THEREFOR

[75] Inventors: Henricus W. G. Haenen; Gerardus J. M. Hesselmann; Howard C. Needs, all of Eindhoven, Netherlands

[73] Assignee: U.S. Philips Corporation, New York, N.Y.

[21] Appl. No.: 58,579

[22] Filed: Jul. 18, 1979

[30] Foreign Application Priority Data

Aug. 21, 1978 [NL] Netherlands ................. 7808609

[51] Int. Cl.³ .......................................... H04N 5/20
[52] U.S. Cl. .................................. 358/164; 358/171
[58] Field of Search ............................. 358/164, 171

[56] References Cited

U.S. PATENT DOCUMENTS 3,845,326 10/1974 Godden .......................... 358/164

FOREIGN PATENT DOCUMENTS 46-26047 7/1971 Japan ........................... 358/164

*Primary Examiner*—Richard Murray
*Attorney, Agent, or Firm*—Thomas A. Briody; William J. Streeter; Edward W. Goodman

[57] ABSTRACT

A gamma correction circuit for a video signal which is simple to be integrated in a semiconductor body and which has a minimum of adjusting points in a simple adjusting procedure. The signal whose gamma is to be corrected is applied to a linear and to a non-linear amplifier circuit, a pulse having a determined amplitude being added in line blanking periods. The amplifier output signals whose black level is fixed are applied to a signal comparison circuit for the pulse amplitudes and a differential signal is fed back to the input of the non-linear amplifier circuit. The signal whose gamma is to be corrected is formed from the amplifier output signals via a potentiometer.

5 Claims, 1 Drawing Figure

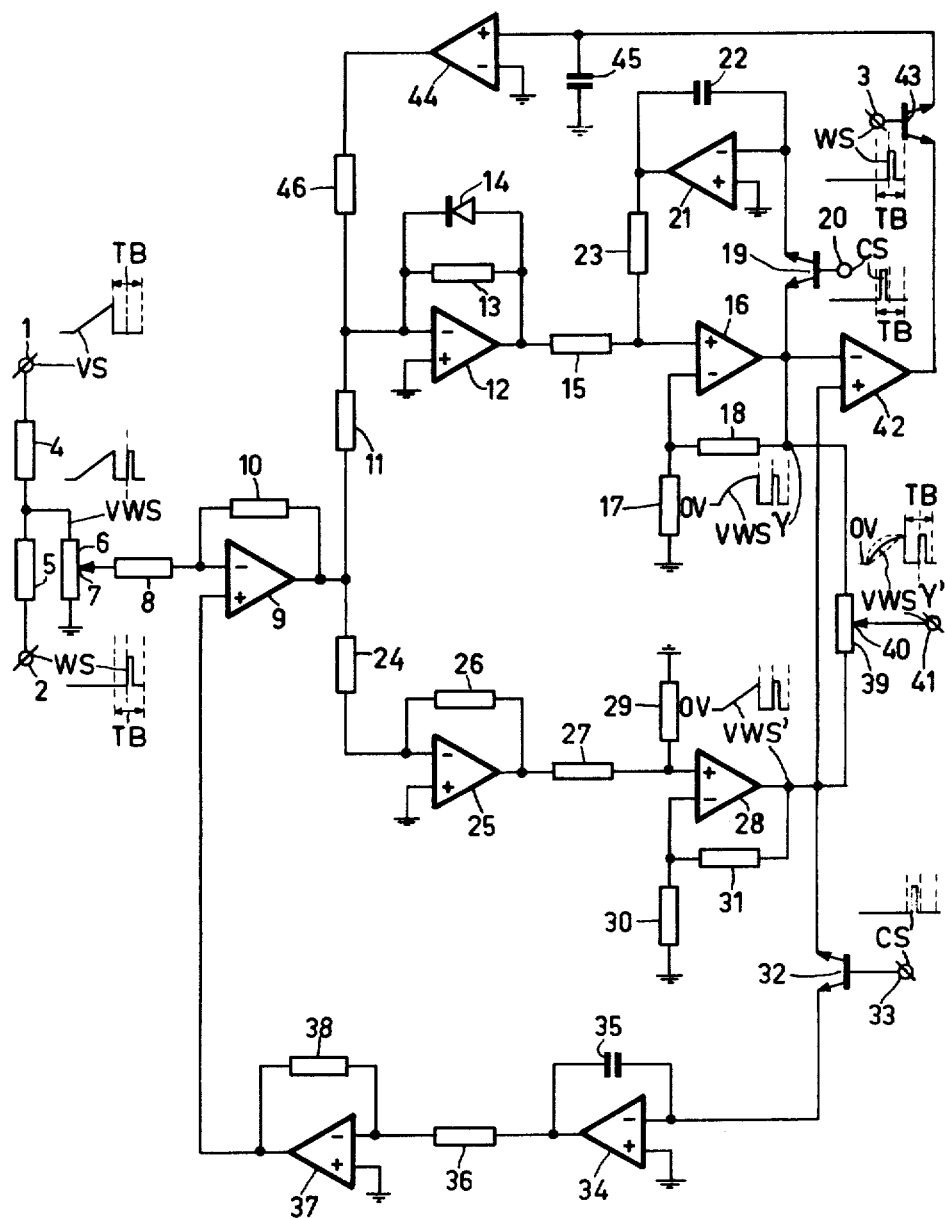

GAMMA CORRECTION CIRCUIT FOR A VIDEO SIGNAL AND TELEVISION CAMERA SUITABLE THEREFOR

BACKGROUND OF THE INVENTION

The invention relates to a gamma correction circuit for a video signal, comprising a linear and a non-linear amplifier circuit and at least a black level clamping circuit, amplifier outputs being connected to inputs of a signal combining circuit comprising an output for carrying the gamma-corrected signal.

Such a gamma correction circuit is described in the Netherlands application No. 6 807 530. It is described that in the signal combining circuit a differential signal is first formed from the linear and the non-linear amplifier signals, which differential signal is thereafter added, to a certain extent, to the linear signal to obtain the gamma corrected output signal.

When the differential signal is being formed it is essential that the same signal level be present in the linearly as in the non-linearly amplified signal, in the presence of the so-called black level or peak-white level. Namely, the differential signal must have the value zero at the black and the peak-white levels respectively. This requirement is very stringent as otherwise, not only the degree of gamma correction is changed but also the peak-peak value of the video signal is affected during a gamma adjustment. In practice this is impermissible; a change in the gamma correction must not affect the peak-peak value of the video signal and, consequently, the contrast range on display.

SUMMARY OF THE INVENTION

It is an object of the invention to provide a gamma correction circuit wherein no differential signal derivation for the gamma correction is used whereas this circuit is furthermore suitable for integration in a semiconductor body, a stable gamma correction being obtained with a minimum of adjusting points and by means of a simple adjustment procedure. According to the invention a gamma correction circuit is therefore characterized in that the outputs of the linear and the non-linear amplifier circuits are coupled to inputs of a signal comparison circuit for comparing, in line blanking periods, the amplitude of a pulse-shaped signal present in the amplifier output signals, the output of the signal comparison circuit being coupled to the input of the non-linear amplifier circuit.

The combination of the presence, in the line blanking periods, of the pulse having a determined amplitude in the signal to be amplified linearly and non-linearly, of the signal comparison at the amplified signals and of the feedback of the result of the comparison to the signal input of the non-linear amplifier circuit gives, results in that in all circumstances, the peak-peak value of the gamma-corrected signal is automatically fixed at that determined pulse amplitude.

A simple embodiment of a gamma correction circuit, to which a video signal whose gamma must be corrected can be applied through a dc connection (the black level already having been fixed) or capacitively, is characterized in that the output of the linear amplifier circuit is coupled to an input of a first black level clamping circuit which has its output coupled to inputs of the linear and the non-linear amplifier circuits.

A further simple embodiment is characterized in that inputs of the linear and non-linear amplifier circuits are connected to the output of an input amplifier which has an input connected to the output of the first black level clamping circuit, another input being provided for the supply of the video signal and the pulse-shaped signal present with a determined amplitude in the line blanking periods.

An embodiment of a gamma correction circuit which guarantees that the signal comparison circuit produces an output signal equal to zero in the presence of the black level in the linearly and non-linearly amplified video signal is characterized in that the output of the non-linear amplifier circuit is connected to inputs of the signal comparison circuit and of the signal combining circuit through a post-amplifier, the post-amplifier output being connected to an input of a second black level clamping circuit, the output of which is connected to an input of the post-amplifier.

A gamma correction circuit comprising a simple embodiment of the signal comparison circuit is characterized in that the signal comparison circuit comprises a differential amplifier, inputs of which are coupled to the outputs of the linear and the non-linear amplifier circuits, a switching transistor, connected to the differential amplifier output, a line-frequency pulse switching signal being applied for on-off switching purpose to this switching transistor with a switch-on pulse occurring with the same and a shorter duration, respectively, within the pulse duration of said pulse-shaped signal present in the amplifier output signals, and a buffer amplifier connected to the switching transistor, the output of the buffer amplifier being coupled to an input of the non-linear amplifier circuit.

DESCRIPTION OF THE DRAWING

The invention will be further explained by way of non-limitative example with reference to the accompanying FIGURE of a gamma correction circuit.

DESCRIPTION OF THE PREFERRED EMBODIMENT

In the FIGURE reference numerals 1 and 2, respectively, denote input terminals of the gamma correction circuit to which a video signal VS and a pulse-shaped signal WS, respectively are applied. The video signal VS is generated by a television pick-up device and originates from one of the signal processing circuits which usually follow after this pick-up device. The video signal VS is shown in the FIGURE with a linearly increasing signal shape until the occurrence of a line blanking period denoted by TB. The video signal VS is produced line-periodically in a manner known for television.

The pulse-shaped signal WS at the input terminal 2, which, for brevity, will be denoted the white-pulse signal WS and which is also present at an input terminal 3 in the form of a white-pulse switching signal WS, has a pulse of a determined amplitude during the line blanking period TB. The pulse amplitude in the signal WS at the input terminal 2 is a measure of the peak-peak value between a black and a top-white level in the video signal VS. From the signal shapes shown in the FIGURE it follows that the linear increase in the video signal VS occurs from the black level to the peak-white level. The amplitude of the white pulse signal WS may be between, for example, 0.5 and 1 V.

The input terminals 1 and 2 are interconnected through two resistors 4 and 5. The junction, which carries a signal VWS shown next to it, is connected to ground through a potentiometer 6. The potentiometer 6 is provided with a potentiometer tap 7 which is connected to a (−) input of an (operational) amplifier 9 through a resistor 8. The output of the amplifier 9, which is further provided with a (+) input, is fed back to the (−) input through a resistor 10 and is connected through a resistor 11 to the (−) input of an amplifier 12 whose (+) input is connected to ground. The output of the amplifier 12 is fed back to the (−) input thereof through a parallel arrangement of a resistor 13 and a diode 14. Thus a non-linear amplifier circuit (12, 13, 14) is formed in its most simple form, whose non-linear characteristic is given by the diode 14.

Through a resistor 15 the output of the amplifier 12 is connected to the (+) input of an amplifier 16 whose (−) input is connected to ground and to the amplifier output, respectively, through resistors 17 and 18, respectively. The output of the amplifier 16 is further connected to an electrode of a symmetrical switching transistor 19 which can pass current into two directions, the base electrode being connected to an input terminal 20 to which a signal CS, shown next to it, is applied as a clamping signal. The signal CS has a clamping pulse in the line blanking period TB which precedes the pulse occurring in the white-pulse (switching) signal WS which is inter alia shown next to the input terminal 3. Instead of preceding it, the pulse in the signal CS can also follow the pulse occurring in the signal WS, but coincidence of these pulses is not allowed. Another electrode of the switching transistor 19 is connected to the (−) input of an amplifier 21 whose (+) input is connected to ground. Through a capacitor 22 the (−) input is connected to the output of the amplifier 21 which is further connected to the (+) input of the amplifier 16 through a resistor 23. Thus a keyed black level clamping circuit (19-23) is provided at the amplifier 16 which operates as a post-amplifier, the clamping circuit comprising an integration circuit (19, 21, 22). The ground potential present at the (+) input of the amplifier 21 results in that the black level has been fixed at the oV ground potential in a gamma-corrected signal VWSγ present at the output of the amplifier 16.

Through a resistor 24, the output of the amplifier 9 is connected to the (−) input of an amplifier 25 whose (+) input is connected to ground. The output of the amplifier 25 is fed back to the (−) input thereof through a resistor 26. The amplifier 25 and the resistor 26 provide a linear amplifier circuit (25-26). Through a resistor 27, the output of the amplifier 25 is connected to the (+) input of an amplifier 28 which (+) input is further connected to ground through a resistor 29. The (−) input of the amplifier 28 is connected to ground and to the amplifier output, respectively, through resistors 30 and 31, respectively. The amplifier 28 functions as a post-amplifier with respect to the linear amplifier circuit (25-26).

The output of the amplifier 28 is connected to an electrode of a symmetrical switching transistor 32 whose base electrode is connected to an input terminal 33 to which the signal CS is applied as the clamping signal. Another electrode of the switching transistor 32 is connected to the (−) input of an amplifier 34 whose (+) input is connected to ground. Through a capacitor 35 the (−) input is connected to the output of the amplifier 34 which is further connected to the (−) input of an amplifier 37 through a resistor 36. The (+) input of the amplifier 37 is connected to ground and the output is fed back to the (−) input through a resistor 38. The output of the inverting amplifier 37 is connected to the (+) input of the (input) amplifier 9. Thus, a keyed black level clamping circuit (32-38), comprising an integration circuit (32, 34, 35) is provided at the input amplifier 9, the linear amplifier circuit (25, 26) and the post-amplifier 28. The ground potential present at the (+) input of the amplifier 34 gives that the black level is fixed to the oV ground potential in a linearly amplified signal VWS' present at the output of the amplifier 28.

The outputs of the amplifiers 16 and 28 are interconnected through a potentiometer 39. The tap 40 of the potentiometer 39 is connected to the output terminal 41 of the gamma correction circuit which carries a signal VWSγ, shown next to it in the drawing. Depending on the position of the potentiometer tap 40, a signal combining circuit (39, 40) thus produces the signal VWSγ' whose gamma is corrected to a desired degree. The pulse originating from the white-pulse signal WS present at the input terminal 2 occurs in the signal VWSγ' in the periodic line blanking period TB. To remove, if so desired, the white pulse, a line blanking circuit, not shown, may follow the output terminal 41, so that the black level having the oV ground potential is present during the whole line blanking period TB.

In accordance with an aspect of the invention, the outputs of the amplifiers 16 and 28 carrying the signals VWSγ and VWS', respectively, are connected to the (−) and (+) inputs, respectively, of a differential amplifier 42. The output of the amplifier 42 is connected to an electrode of a symmetrical switching transistor 43 whose base electrode is connected to the input terminal 3, to which the signal WS is applied as the white-pulse switching signal. Another electrode of the switching transistor 43 is connected to the (+) input of an amplifier 44 whose (−) input is connected to ground. The (+) input of the amplifier 44 is connected to ground through a capacitor 45 and the output of the amplifier 44 is connected to the (−) input of the amplifier 12 through a resistor 46. Thus a signal comparison circuit (42-46) is formed which includes a buffer amplifier (44, 45).

For the operation of the signal comparison circuit (42-46) it follows that, under the control of the line frequency pulse switching signal WS present at the input terminal 3, the positive, negative or substantially zero result of the comparison of the amplitudes of the white-pulses in the signals VWSγ and VWS' are passed on to the capacitor 45 through the switching transistor 43. The switching pulse duration in the signal at the input 3 must then be equal to or smaller than that in the signal applied to the input 2. Starting point is a substantially zero result of the pulse signal comparison, the black level clamping circuit (32-38) giving such a current through the resistor 11 in the presence of the black level which has the ground potentials, in the signal VWS that the diode 14 is set to a certain, desired setting point in its diode characteristic. As a result thereof, the signal VWSγ shown in the drawing is produced at the output of the amplifier 16 at the supply of the linearly increasing input signal VS. Should now, by, for example, a change in temperature or due to aging of a component, or to some other cause a noticeable difference threaten to be produced between the amplitude of the white pulses in the signals VWSγ and VWS', the amplifier 42 will give a small positive or negative voltage across the capacitor 45. This small negative or positive capacitor voltage produces a certain negative or positive current through the resistor 46, whereby for the diode the setting point in the diode characteristic is shifted so and, at the same time, the white pulse amplitude in the signal VWSγ is increased and decreased, respectively, that finally a substantially zero result is produced again by the differential amplifier 42. It will be clear that, as always happens with any control system, a small negligible deviation is always present between the signal values to be compared. In addition it should be noted that, instead of the single diode 14 and resistor 13, a multiple diode-resistor network, either combined or not combined with current sources, can be used in the non-linear amplifier circuit (12, 13, 14).

In the shown gamma correction circuit the signal VWS is applied though a d.c. connection to the circuit, the black level in the signal VWS, for example already having been fixed at the ground potential in preceding circuits. This is not required as, when the signal VWS is applied through a capacitor so that the zero component is lost, the black level clamping circuit (32–38) fixes the black level in the signal VWS' at the oV ground potential, the black level clamping circuit (19–23) giving that also the black level in the signal VWSγ is fixed at the oV ground potential so that it is assured that the same applies to the gamma-corrected output signal VWSγ'.

It appears that the shown gamma correction circuit comprises only the two potentiometers 6 and 39 by way of adjusting elements so that a minimum of adjusting points and a simple adjusting procedure has been realised. Except for the capacitors 22, 35 and 45 and the potentiometers 6 and 39 the other components are easily integrable in a semiconductor body. It is of practical value to keep also the resistors 4 and 5 outside the semiconductor body. The symmetrical switching transistors 19, 32 and 43 can, depending on the semiconductor technology, be implemented for example with two transistors arranged in antiparallel, that is to say that the emitter and collector electrodes of two transistors are interconnected. Furthermore, transistors of the insulated gate electrode type could be used.

What is claimed is:

1. A gamma correction circuit for a video signal comprising a linear and a non-linear amplifier circuit and at least a black level clamping circuit, the linear and non-linear amplifier outputs being connected to inputs of a signal combining circuit which includes an output for carrying the gamma-corrected signal, characterized in that said gamma correction circuit further comprises a signal comparison circuit coupled to the outputs of the linear and non-linear amplifier circuits for comparing, in line blanking periods, the amplitude of a pulse-shaped signal, having been added to said video signal, present in the linear and non-linear amplifier output signals, the output of the signal comparison circuit being coupled to the input of the non-linear amplifier circuit.

2. A gamma correction circuit as claimed in claim 1, characterized in that the output of the linear amplifier circuit is coupled to an input of said black level clamping circuit which has its output coupled to the inputs of the linear and the non-linear amplifier circuits.

3. A gamma correction circuit as claimed in claim 2, characterized in that an input amplifier is provided having an output coupled to the inputs of the linear and the non-linear amplifier circuits, said input amplifier having a first input connected to the output of said black level clamping circuit, and a second input for receiving the supply of the video signal and the pulse-shaped signal present with a determined amplitude in the line blanking period.

4. A gamma correction circuit as claimed in claims 1, 2 or 3, which further comprises a post-amplifier coupled to the output of the non-linear amplifier circuit, said post-amplifier having an output which is connected to inputs of the signal comparison circuit and of the signal combining circuit, and a second black level clamping circuit having an input coupled to said post-amplifier output, the output of which is connected to the input of the post-amplifier.

5. A gamma correction circuit as claimed in claim 4, characterized in that the signal comparison circuit comprises a differential amplifier, inputs of which are coupled to the outputs of the linear and the non-linear amplifier circuits, a switching transistor connected to the differential amplifier output, a line frequency pulse switching signal being applied, for on-off switching purposes, to this switching transistor with a switch-on pulse having a duration no longer than the pulse duration of said pulse-shaped signal present in the linear and non-linear amplifier output signals, and a buffer amplifier connected to the switching transistor, the output of the buffer amplifier being coupled to the input of the non-linear amplifier circuit.

* * * * *